United States Patent [19]
Kato et al.

[11] 4,253,765
[45] Mar. 3, 1981

[54] MULTI-WAVELENGTH SPECTROPHOTOMETER

[75] Inventors: Iwao Kato, Mito; Shigeru Sonobe, Katsuta, both of Japan

[73] Assignee: Hitachi, Ltd., Japan

[21] Appl. No.: 14,277

[22] Filed: Feb. 22, 1979

[30] Foreign Application Priority Data

Feb. 22, 1978 [JP] Japan .................................. 53/18479
Feb. 24, 1978 [JP] Japan ..................................53/19658

[51] Int. Cl.$^3$ .............................................. G01J 3/28
[52] U.S. Cl. ..................................... 356/328; 356/308
[58] Field of Search ............... 356/308, 309, 328, 326, 356/332, 334

[56] References Cited
U.S. PATENT DOCUMENTS 4,060,327  11/1977  Jacobowitz et al. .................. 356/328

OTHER PUBLICATIONS

Horlick, *Applied Spectroscopy*, vol. 30, No. 2, Mar./Apr. 1976, pp. 113–123.
Horlick et al, *Contemporary Topic of Analytical and Clinical Chemistry*, vol. 1, 1977, pp. 195–205.

*Primary Examiner*—F. L. Evans
*Attorney, Agent, or Firm*—Craig & Antonelli

[57] ABSTRACT

In a multi-wavelength spectrophotometer using a self-scanning detector, the range of wavelengths to be scanned by the detector is divided into plural subranges. These wavelength subranges are subjected to the wavelength scanning with different integration times respectively. The detector output at the scanning of each wavelength subrange is stored in a memory. Thereafter, the stored data is read out in a form of a continuous wavelength range.

8 Claims, 9 Drawing Figures

MULTI-WAVELENGTH SPECTROPHOTOMETER

BACKGROUND OF THE INVENTION

This invention relates to a multi-wavelength spectrophotometer, and more particularly to a multi-wavelength spectrophotometer in which the light entering a spectroscope chamber through an entrance slit is dispersed into various components at different wavelengths by dispersion means such as a diffraction grating or a prism and then introduced into a self-scanning detector to detect and measure the quantities of the respective wavelength components, whereby the measurement over a wide range of wavelengths can be made.

Although a spectrophotometer with a self-scanning detector (hereinafter referred to simply as detector) capable of performing the scanning over a wide range of wavelengths by use of only electrical means has several excellent advantages which the precedent spectrophotometer does not possess, it has encountered the problems that the dynamic range (hereinafter referred to as S/N ratio) of the detector is small, that an expensive detector having a long aperture area and a large number of elements must be used to cover a wide range of wavelengths, and that the influence of stray light is considerable in the measurement of shorter wavelengths and the stray light is difficult to eliminate. These problems make it difficult to put this kind of spectrometer into practical use.

These problems will be further detailed below. In the case where it is desired to design a spectrophotometer capable of covering ultraviolet to visible lights at wavelengths of 340 to 900 nm, a very important matter is the relationship between the characteristic of a light source and the spectroscopic characteristic of a detector. Usually, a tungsten lamp and a silicon photodiode are used respectively as a light source and a detector for the spectrophotometry over the above range of wavelengths. The energy spectrum of the tungsten lamp has its peak on the wavelength range of 900 to 1000 nm while the sensitivity of the silicon photodiode has its peak at the wavelength of about 800 nm. Accordingly, the composite spectroscopic characteristic of the light source and the detector has a remarkably large value, for the longer-wavelength region of 800 to 900 nm, resulting from a multiplied effect of the light source intensity and the detector sensitivity. For the shorter-wavelength region, on the other hand, the composite value is small and the quantity of stray light originating from the longer-wavelength region is considerable. Further, when the spectroscopic efficiency of a diffraction grating is taken into consideration, the detector output level for the longer-wavelength region in the ultraviolet to visible wavelength range would become 100 times as large as that for the shorter-wavelength region of the same range. Though the conventional detector which is not of self-scanning type can correct such an unbalance in output level over the wide range of wavelengths by changing the width of an exit slit and/or the gain of the detector in accordance with wavelengths to be measured, such a correction in the self-scanning type detector by similar operations is difficult since the scanning rate for one detector element is as high as several kHz to several MHz. In addition, the S/N ratio will be usually confined with a range of 200–1000 since the detector output for the incident light of high intensity is limited below a saturated output (usually several volts) while for the light of very low intensity a detector output smaller than the switching noise (several mV) of a MOS switch connected to each light receiving element in the detector cannot be discriminated. Therefore, the enjoyment of the maximum S/N ratio possible for a longer-wavelength region would result in that the S/N ratio for a shorter-wavelength region in vicinity of 340 nm is at highest about 2–10.

In addition, there is a further inconvenience that as described above, though the stray light originating from light of longer wavelengths considerably affects the measurement for the light of storter wavelengths whose quantity is small, it is very difficult to insert a stray light cut-off filter into the system. The reason is that the self-scanning detector has its dimension of several microns to several tens of microns and therefore the positioning of the filter requires a precision of almost the same order. Moreover, to cause a single detector to cover the above-mentioned wavelength range of 340 to 900 nm, the detector to be used must have the total length of about 66 mm when a concave diffraction grating with a radius of curvature $R=200$ mm and $d=600$ striae/mm is used, and the total length of about 33 mm even when a very small concave diffraction grating with $R=100$ mm and $d=600$ striae/mm is used. However, the detector presently available in the market has at best an interelement pitch of 20–50 microns and the total length of about 30 mm. The detector of this class is also very expense and therefore the range of wavelengths capable of being measured or covered must be narrowed to avoid too much expense.

SUMMARY OF THE INVENTION

An object of this invention is to eliminate the above-described problems and to provide a multi-wavelength spectrophotometer having a wide applicability, in which the measurement over a wide range of wavelengths can be effectively made.

To that end, the range of wavelengths to be scanned by a self-scanning detector is divided into plural subranges. These subranges are respectively scanned for different integration times. After the overall scanning, information over a continuous wavelength range including the subranges is derived. Thus, a multi-wavelength spectrophotometer having a large S/N ratio over a wide range of wavelengths can be provided.

DESCRIPTION OF THE PREFERRED EMBODIMENTS

Figure 1:
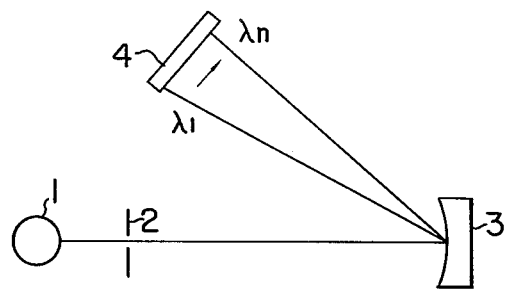
FIG. 1 schematically shows the arrangement of an optical system as an embodiment of this invention.

Referring to FIG. 1 showing schematically the arrangement of an optical system as an embodiment of this invention, reference numeral 1 designates a light source, numeral 2 an entrance slit, numeral 3 a concave diffraction grating, and numeral 4 a detector.

Figure 2:
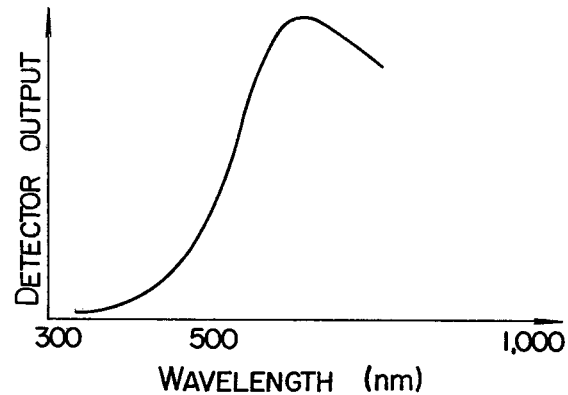
FIG. 2 graphically shows a spectroscopic output characteristic of a detector used in a multi-wavelength spectophotometer, when the wavelength range is scanned for a single integration time.
Figure 3:
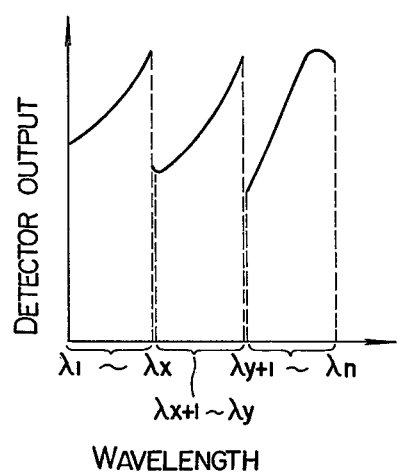
FIG. 3 graphically shows a spectroscopic output characteristic of the same detector, when a plurality of wavelength subranges are scanned for different integration times.

FIG. 2 shows a spectroscopic detector output when the detector scans a range of ultraviolet to visible wavelengths for a single integration time. In the case where the whole range of wavelengths to be scanned is covered with the single integration time, the detector output in a shorter-wavelength region is small and the S/N ratio in that region is insufficient if the integration time is selected to be suitable for a longer-wavelength region. On the other hand, if the integration time is selected to be suitable for the shorter-wavelength region, the detector output is saturated in longer-wavelength region, thereby rendering the measurement in that region impossible. Accordingly, if the range of wavelengths to be scanned is divided into subranges depending on the output levels of the detector and optimum integration times are allotted to the respective subranges, as shown in FIG. 3, the whole wavelength range can be subjected to measurement under an optimum condition.

Figure 4:
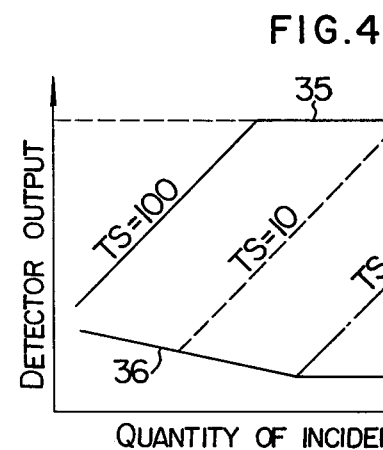
FIG. 4 shows the relationship between the output of a self-scanning detector and the quantity of incident light, with the accumulation time varied as a parameter.

Now, the integration (or exposure) time of the self-scanning detector will be explained with the aid of FIG. 4. The "integration time" is a period of time from the instant at which an MOS switch connected in series with the associated light receiving element in the detector in its conducting state during the duration of a gate pulse applied thereto to provide an output to an external circuit is turned off, to the instant at which the MOS switch is again turned on. During the turn-off of the MOS switch, the associated light receiving element is isolated from the external circuit so that the light receiving element continuing to receive the incident light continues to supply a photocurrent into a capacitance connected in parallel therewith. In other words, the "integration time" is a time for which the photocurrent is accumulated in the capacitance. An approach for changing the integration time is disclosed in the Horlick et al article entitled "Photodiode Arrays for Spectrochemical Measurements" in CONTEMPORARY TOPICS IN ANALYTICAL AND CLINICAL CHEMISTRY, Vol. 1 (1977), pp. 195–205. If the integration time is made longer, a sufficient output can be obtained from very weak light. The provision of a predetermined integration time to the detector is termed "detector operated in charge accumulation mode". However, the integration time cannot be made too long since too long integration time results in a considerable adverse effect due to a dark current inherent to the light receiving element. FIG. 4 shows the relationship between the quantity of incident light and the detector output, with the integration time $T_s$ varied as a parameter. In the figure, a line 35 indicates the saturated level of output, a curve 36 the noise level, and DR the dynamic range. It is seen from FIG. 4 that the quantity of incident light and the integration time $T_s$ has an inverse proportion relationship therebetween to obtain the same detector output. In other words, if the integration time is increased by one order, the quantity of light reduced by one order can be detected. This suggests that the inconveniences described in conjunction with FIG. 2 can be eliminated if the accumulation time $T_s$ is set longer for a shorter-wavelength region having small light quantity and shorter for a longer-wavelength region having large light quantity.

Figure 5:
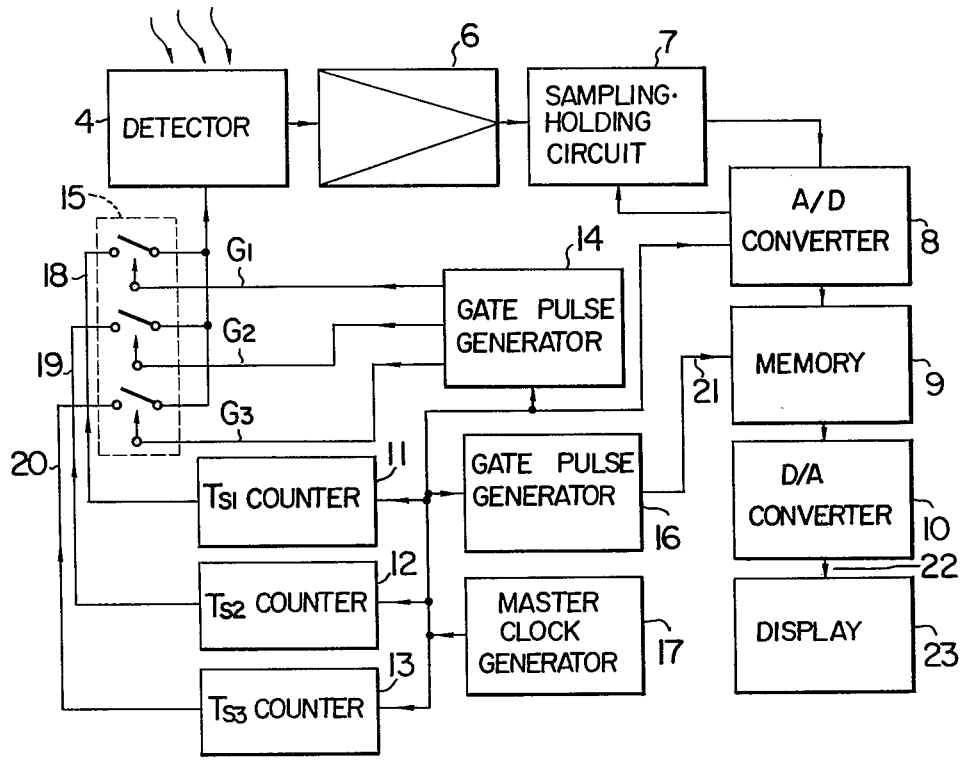
FIG. 5 shows in block diagram an example of a signal processing circuit used with the embodiment of this invention shown in FIGS. 1 and 3.
Figure 6:
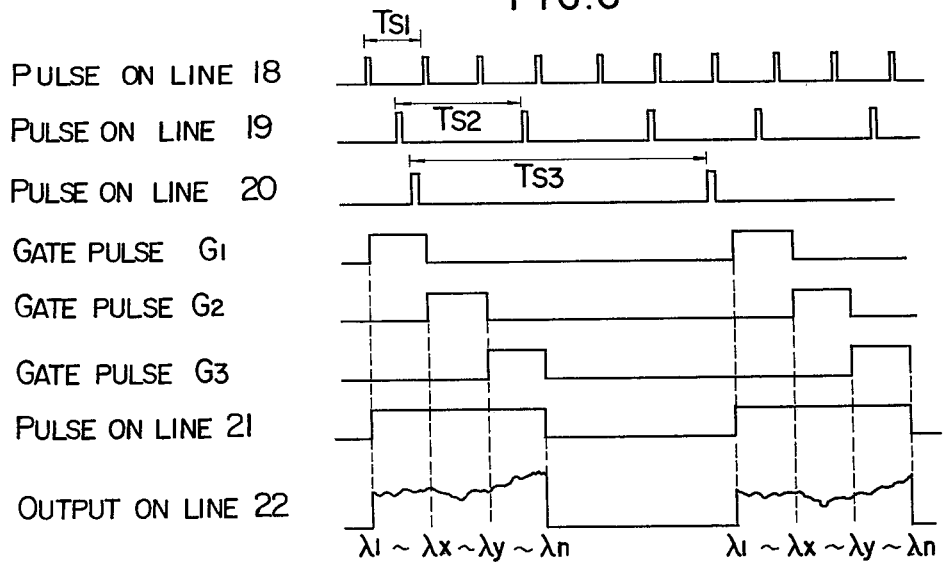
FIG. 6 shows the time chart of waveforms appearing at several points in the circuit shown in FIG. 5.

A problem in display takes place in the case where the whole range of wavelengths to be scanned is divided into plural subranges as described above and different integration times are set for these subranges respectively. Namely, if a single scanning time is employed for all the wavelength subranges and the detector output is displayed in real time, discontinuities which are difficult to see appear on the displayed spectrum due to the use of the different integration times, thereby making the position of the corresponding wavelengths inaccurate. This display cannot be put into practical use. In order to solve this problem, this invention employs a scheme that the detector output at the scanning for each wavelength subrange is stored in particular bits of a memory in order of scanned wavelengths and the stored data is continuously read out after the completion of the scanning of the whole wavelength range. According to this invention, therefore, the display of spectrum without discontinuities and a measurement having a large S/N ratio can be performed. A signal processing circuit for this purpose is shown in FIG. 5 and the time chart of waveforms appearing at several points in the circuit of FIG. 5 is shown in FIG. 6.

The operation of a spectrophotometer according to this invention will be described in detail with the aid of FIGS. 3, 5 and 6.

The scanning of wavelengths is made in the direction of $\lambda_n \rightarrow \lambda_1$ in FIG. 3. The integration times for the wavelength subranges $\lambda_n \sim \lambda_{y+1}$, $\lambda_y \sim \lambda_{x+1}$ and $\lambda_x \sim \lambda_1$ are $T_{s1}$, $T_{s2}$ and $T_{s3}$ respectively. First, a pulse signal for the integration time $T_{s1}$ from a $T_{s1}$ counter shown in FIG. 5 are applied through a multiplexer 15 to a detector 4 in response to a gate pulse $G_1$ from a gate pulse generator 14 so that the whole range of $\lambda_n \sim \lambda_1$ is scanned. The output of the detector 4 is sent through a preamplifier 6, a sampling and holding circuit 7 and an A/D converter 8 to predetermined wavelength-related bits in a memory 9 for storing therein.

Then, in response to a gate pulse $G_2$ from the generator 14, a pulse signal for the integration time $T_{s2}$ from a $T_{s2}$ counter 12 is applied to the detector 4 so as to scan the region of $\lambda_y \sim \lambda_1$, i.e. the two subranges of $\lambda_y \sim \lambda_{x+1}$ and $\lambda_n \sim \lambda_1$. The output of the detector 4 at the time of this scanning is stored in an overlapping relation on those addresses in the memory 9 where the output related to $\lambda_y \sim \lambda_1$ at the first scanning for the integration time $T_{s1}$ has been stored. Finally, in response to a gate pulse $G_3$ from the generator 14, a pulse for the integration time $T_{s3}$ is sent from a $T_{s3}$ counter 13 to the detector 4 so as to scan the subrange of $\lambda_x \sim \lambda_1$. The output of the detector 4 at the time of this scanning is stored in an overlapping relation on those addresses in the memory 9 where the output related to $\lambda_x \sim \lambda_1$ at the second scanning for the integration time $T_{s2}$ has been stored. Thus, the scanning of the whole wavelength range is completed. As a result, the memory 9 has data including signals corresponding to the subrange of $\lambda_n \sim \lambda_{y+1}$ scanned with the integration time $T_{s1}$, the subrange of $\lambda_y \sim \lambda_{x+1}$ scanned with $T_{s2}$ and the subrange of $\lambda_x \sim \lambda_1$ scanned with $T_{s3}$. Under the control of a memory control pulse from a gate pulse generator 21, all bits related to wavelengths $\lambda_1 \sim \lambda_n$ in the memory 9 are integrally supplied to a display 23 through a D/A converter 10, so that the measurement with sufficient S/N ratio over a wide range of wavelengths is possible.

Figure 7:
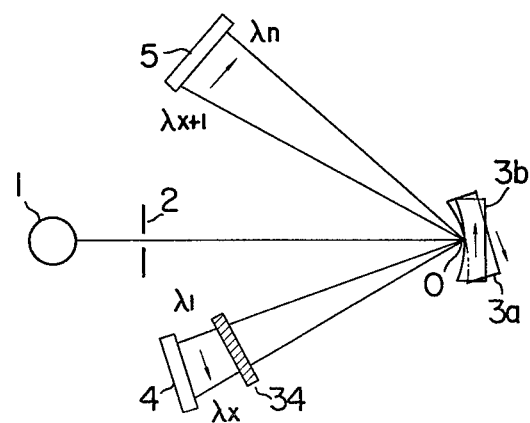
FIG. 7 schematically shows the arrangement of an optical system as another embodiment of this invention.

FIG. 7 shows the arrangement of an optical system as another embodiment of this invention. In FIG. 7, reference numeral 1 indicates a light source, numeral 2 an entrance slit, numerals 3a and 3b concave diffraction gratings, and numeral 4 and 5 detectors. The concave diffraction gratings 3a and 3b have the same characteristic. In order to prevent the interference between diffracted lights from the gratings 3a and 3b, the blaze directions of the gratings 3a and 3b are opposite to each other as indicated by arrows and the central axes of the blazes are positioned perpendicular to the sheet of the drawing. In FIG. 7, the two gratings are offset for clarity by rotating the grating 3a. The entrance slit 2 must therefore have such dimensions as to effectively supply incident light to the gratings 3a and 3b. The detectors 4 and 5 are so disposed as to scan in the directions indicated by arrows, respectively. The light emitted from the light source 1 is passed through the entrance slit 2, diffracted by the respective concave diffraction gratings 3a and 3b and cast upon the detectors 4 and 5. Namely, the detector 4 receives light components having shorter wavelengths corresponding to the subrange $\lambda_1 \sim \lambda_x$ and the detector 5 receives light components having longer wavelengths corresponding to the subranges $\lambda_{x+1} \sim \lambda_n$. The scanning of the wavelength subranges $\lambda_1 \sim \lambda_x$ and $\lambda_{x+1} \sim \lambda_n$ received by the detectors 4 and 5 is made in the directions of $\lambda_1 \rightarrow \lambda_x$ and $\lambda_{x+1} \rightarrow \lambda_n$ with respective integration times $T_s$ optimum to the received light quantities by a scanning circuit (hereinafter described in conjunction with FIG. 8) for the detectors 4 and 5. Then, the outputs of the detectors 4 and 5 are so integrated as if the range of the wavelenghts $\lambda_1 \sim \lambda_n$ were scanned continuously from $\lambda_1$ to $\lambda_n$.

A band-pass filter 34 for preventing stray light is placed in front of the detector 4 for shorter-wavelength subrange which is subjected to the adverse effect of the stray light. Although in the prior art system the incorporation of such a stray preventing filter was very difficult since a single detector having a long aperture area was used, the filter can be easily arranged according to the system emboding this invention since the detector 4 has only to cover a narrow wavelength range.

Figure 8:
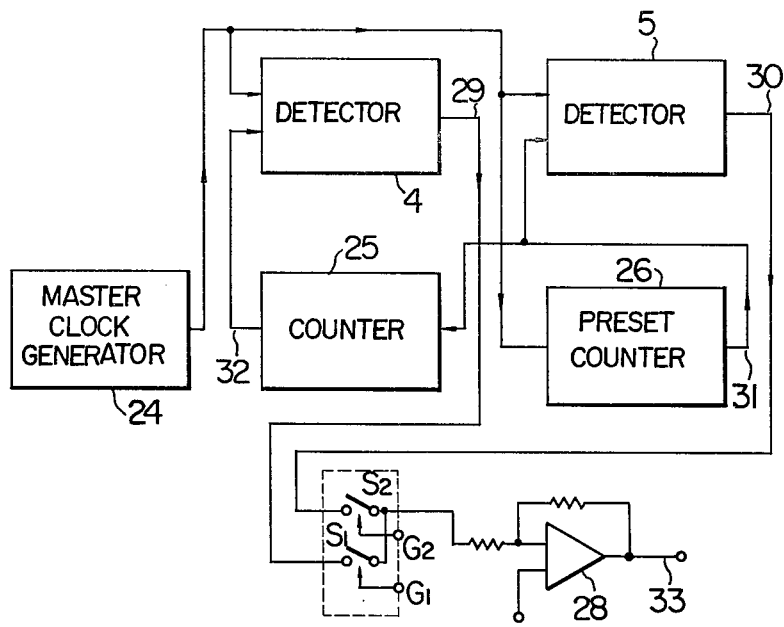
FIG. 8 shows in block diagram an example of a signal processing circuit used with the embodiment of this invention shown in FIG. 7.

FIG. 8 shows in block diagram a signal processing circuit used in the embodiment of FIG. 7. In FIG. 8, a master clock generator 24 delivers a clock signal to the detectors 4, and a preset counter 26. A value larger than the number of elements or bits of the detector 5 by several bits is set in the preset counter 26 and the counter 26 counts up the number of the clock pulses of the clock signal applied thereto. When the counted content becomes equal to the preset value, the counter 26 delivers an output pulse 31 to be sent to the detector 5 and a counter 25. The counter 25 frequency-divides the received pulse signal to deliver an output pulse 32 which is in turn supplied to the detector 4 to set a suitable integration time $T_s$ for the detector 4. The outputs 29 and 30 of the detectors 4 and 5 are respectively sent to the terminals of the switches $S_1$ and $S_2$ of a multiplexer 27 and there selected by the switches $S_1$ and $S_2$ in response to control pulses $G_1$ and $G_2$. The selected output is supplied to an operational amplifier 28 and the amplified output is provided at an output terminal 33.

Figure 9:
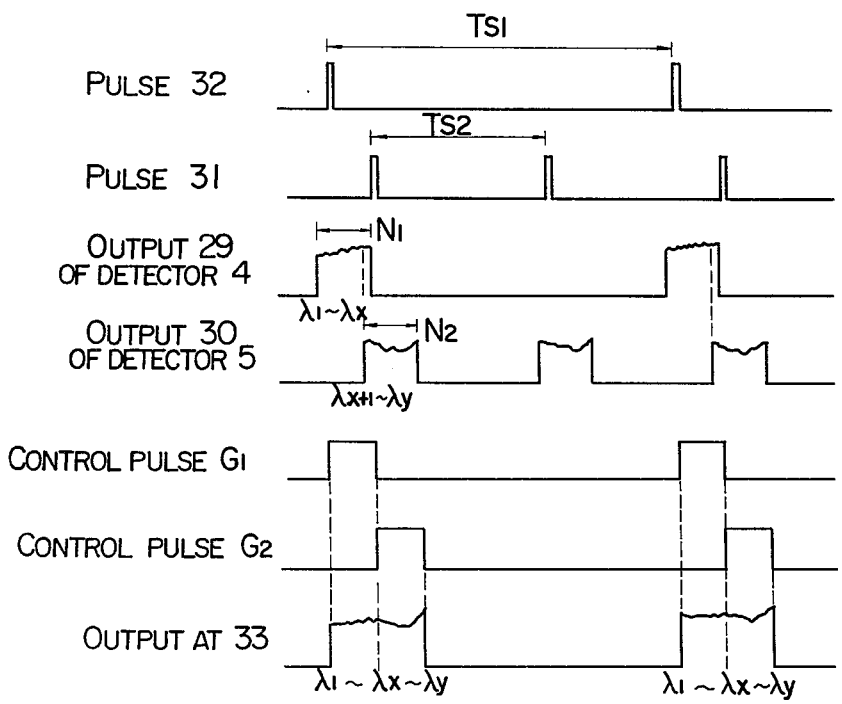
FIG. 9 shows the time chart of waveforms appearing at several points in the circuit shown in FIG. 8.

FIG. 9 shows the time chart of waveforms appearing at several points in the circuit shown in FIG. 8 and useful in explaining the operation of the circuit. The output pulses from the counter 25 (i.e. the start pulses 32 for the detector 4) have a pulse interval $T_{s1}$ (integration time) which is set longer for the shorter-wavelength subrange (weak light range) covered by the detector 4. As regards the detector 5 for covering the longer-wavelength subrange where the quantity of incident light is large, the integration time is not set so long. With respect to this, the output pulses of the preset counter 26 have a pulse internal $T_{s2}$ (integration time) which is selected to be a value slightly larger than the minimum scanning period, i.e. the number of elements divided by the clock frequency. The start pulses 32 for the detector 4 can be obtained by frequency-dividing the pulse output 31 from the preset counter 26 and subjecting the frequency-divided pulses to synchronization. The pulses 32 and 31 serve as the start pulses for the detectors 4 and 5 respectively. Thus, the output 29 or 30 of the detector 4 or 5 is a train of signals which have their leading edges coincident with those of the start pulses 32 or 31, each of which contains components corresponding to the number $N_1$ or $N_2$ of elements in the detector 4 or 5 and which have an interval corresponding to the integration time $T_{s1}$ or $T_{s2}$, as shown in FIG. 9. The outputs 29 and 30 overlap for a time corresponding to a few or several elements. These outputs 29 and 30 are selected in response to the control pulses $G_1$ and $G_2$ applied to the multiplexer 27 and a continuous output over the wavelength range of $\lambda_1 \sim \lambda_n$ is delivered to the output terminal 33.

As described above, according to this invention, a multi-wavelength spectrophotometer having large S/N ratio over a wide range of wavelengths can be provided.

In the foregoing embodiments, the diffraction grating shown in FIG. 1 or 7 has been positioned to directly receive incident light. However, other suitable configuration of mounting the diffraction grating may be employed to attain the same result. Also, the wavelength scanning direction employed in FIGS. 1, 5 and FIGS. 7, 8 may be reversed. Further, if the switches $S_1$ and $S_2$ in FIG. 8 are caused to exclusively treat the outputs of the detectors 4 and 5 respectively without being changed over by control pulses, the detector output signals can be individually obtained. Though the diffraction grating has been used as a dispersion element, it is of course that a prism may be used instead of the grating.

We claim:

1. A multi-wavelength spectrophotometer comprising:
   an entrance slit;
   dispersion means for dispersing light through said entrance slit into various components at different wavelengths;
   self-scanning detector means for receiving the light from said dispersion means to detect the quantity of the received light, the range of wavelengths to be scanned by said detector means being divided into plural wavelength subranges; and
   scanning means for scanning said wavelength subranges of said detector means with different integration times respectively.

2. A multi-wavelength spectrophotometer according to claim 1, further comprising memory means for storing the outputs of said detector means in order of the respective scannings of said wavelength subranges, the stored contents in said memory means being continuously read out in a form of said wavelength range.

3. A multi-wavelength spectrophotometer according to claim 1, wherein the integration time is set shorter for the wavelength subrange including longer wavelengths.

4. A multi-wavelength spectrophotometer according to claim 1, wherein said dispersion means includes at least two diffraction gratings arranged on the optical axis of said incident light, said detector means includes at least two self-scanning detectors at the exit sides of said diffraction gratings corresponding to the associated wavelength subranges respectively, said detectors being scanned with the different integration times, and there is provided a signal processing circuit for processing the outputs from said detectors.

5. A multi-wavelength spectrophotometer according to claim 4, further comprising memory means for storing the outputs from said detectors in order of the scannings of the associated wavelength subranges, the stored contents in said memory means being continuously read out in a form of said wavelength range.

6. A multi-wavelength spectrophotometer according to claim 4, wherein the integration time is set shorter for the wavelength subrange including longer wavelengths.

7. A multi-wavelength spectrophotometer according to claim 4, wherein a selected one of said detectors in provided with a stray light eliminating filter just therebefore.

8. A multi-wavelength spectrophotometer according to claim 7, wherein said selected detector is used for the scanning of the wavelength subrange including shorter wavelengths.

* * * * *